US005207287A

United States Patent [19]

Sano et al.

[11] Patent Number: 5,207,287

[45] Date of Patent: May 4, 1993

[54] FOUR-WHEEL STEERING APPARATUS

[75] Inventors: Osamu Sano; Hideo Matsubara, both of Nara; Hirofumi Matsuoka, Kyoto; Yoshikazu Ikegi, Osaka, all of Japan

[73] Assignee: Koyo Seiko Co., Ltd., Osaka, Japan

[21] Appl. No.: 708,499

[22] Filed: May 31, 1991

[30] Foreign Application Priority Data

Jun. 6, 1990 [JP] Japan .......... 2-147784
Jul. 6, 1990 [JP] Japan .......... 2-179862
Nov. 9, 1990 [JP] Japan .......... 2-117787[U]

[51] Int. Cl.[5] .......... B62D 7/14

[52] U.S. Cl. .......... 180/140; 180/143; 280/91

[58] Field of Search .......... 180/140, 141, 143; 280/91, 97

[56] References Cited

U.S. PATENT DOCUMENTS 4,313,514 2/1982 Furukawa et al. .
4,669,567 6/1987 Nakamura et al. .......... 180/140
4,669,744 6/1987 Sano et al. .......... 280/91
4,979,116 12/1990 Takahashi .......... 280/91
5,004,063 4/1991 Oslapas et al. .......... 280/91

FOREIGN PATENT DOCUMENTS 344710 12/1989 European Pat. Off. .
3903834 8/1989 Fed. Rep. of Germany .
3908164 9/1989 Fed. Rep. of Germany .
60-44185 10/1985 Japan .
60-38219 11/1985 Japan .
61-235275 10/1986 Japan .
1-136876 5/1989 Japan .
2-63974 3/1990 Japan .
2-169371 6/1990 Japan .

*Primary Examiner*—Robert J. Oberleitner
*Assistant Examiner*—A. M. Boehler
*Attorney, Agent, or Firm*—Mason, Fenwick & Lawrence

[57] ABSTRACT

A four-wheel steering apparatus comprising a front wheel steering device having a front-wheel steering bar movable for steering front wheels, and a rear-wheel steering device having a rear-wheel steering bar mechanically separated from the front-wheel steering device and movable for steering rear wheels. The latter device has a rear-wheel steering bar drive assembly for moving the rear-wheel steering bar, and a rear-wheel steering control system for controlling the drive assembly in accordance with the steering amount of the front wheels to thereby control the amount of movement of the rear-wheel steering bar and control the steering amount of the rear wheels. The rear-wheel steering device comprises a maximum steering amount regulating assembly having a variably regulating member capable of mechanically restricting the maximum amount of movement of the rear-wheel steering bar and adjusting the maximum amount of movement. The maximum amount of movement of the rear-wheel steering bar to be mechanically restricted by the variably regulating member decreases as the vehicle speed increases.

7 Claims, 13 Drawing Sheets

FIG.12
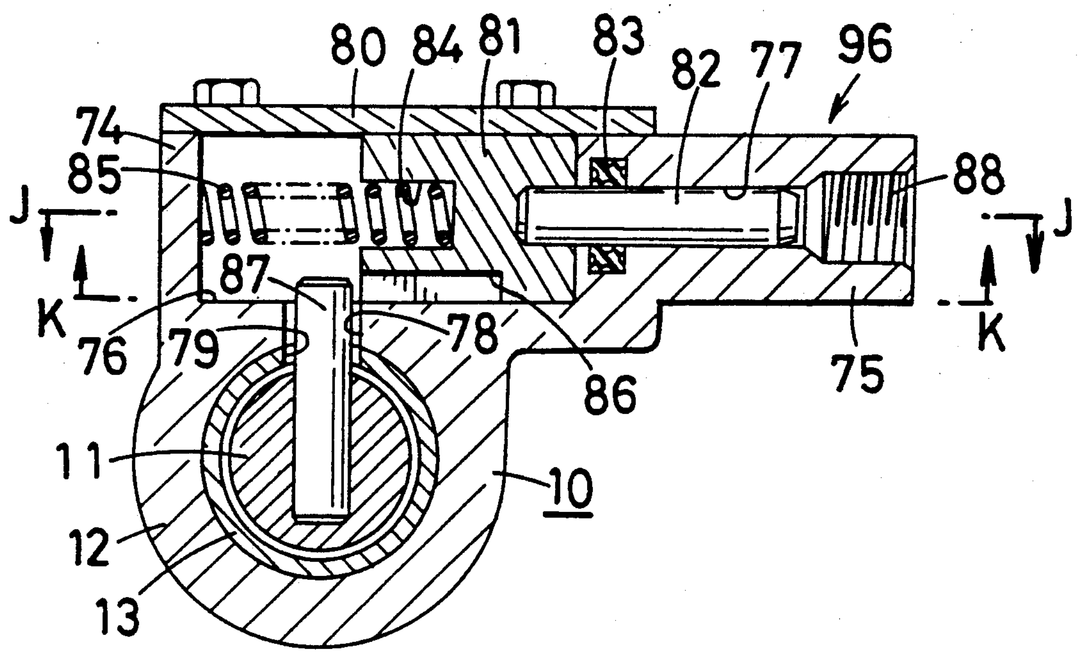
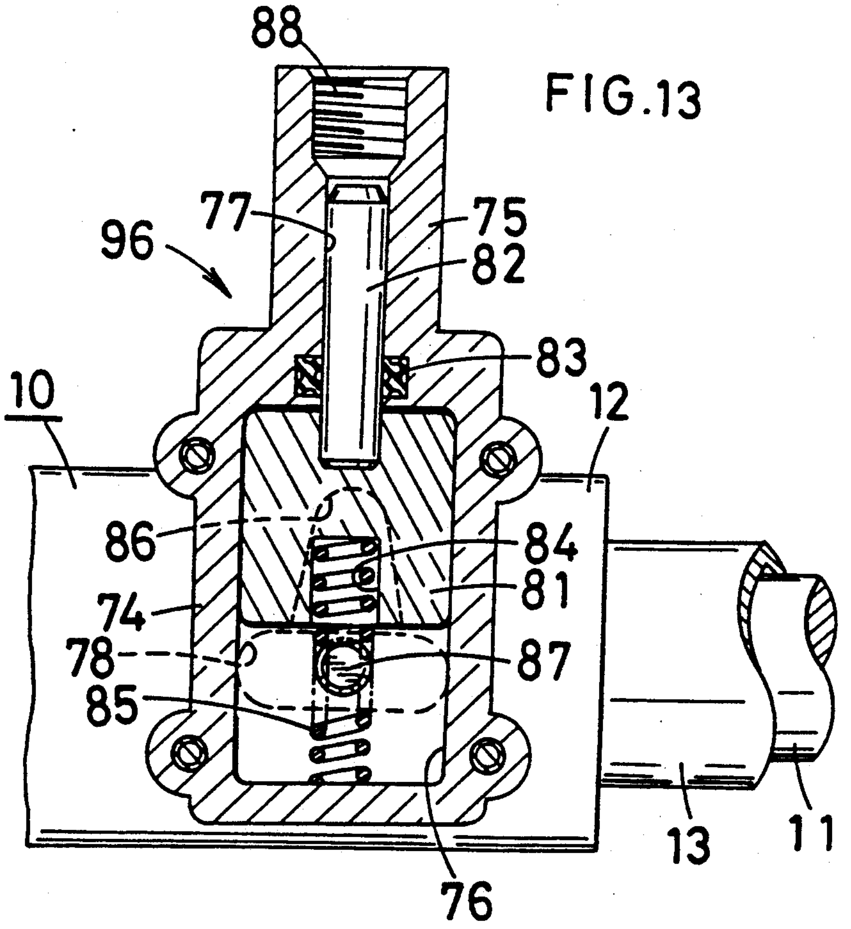
FIG.13

FIG.19
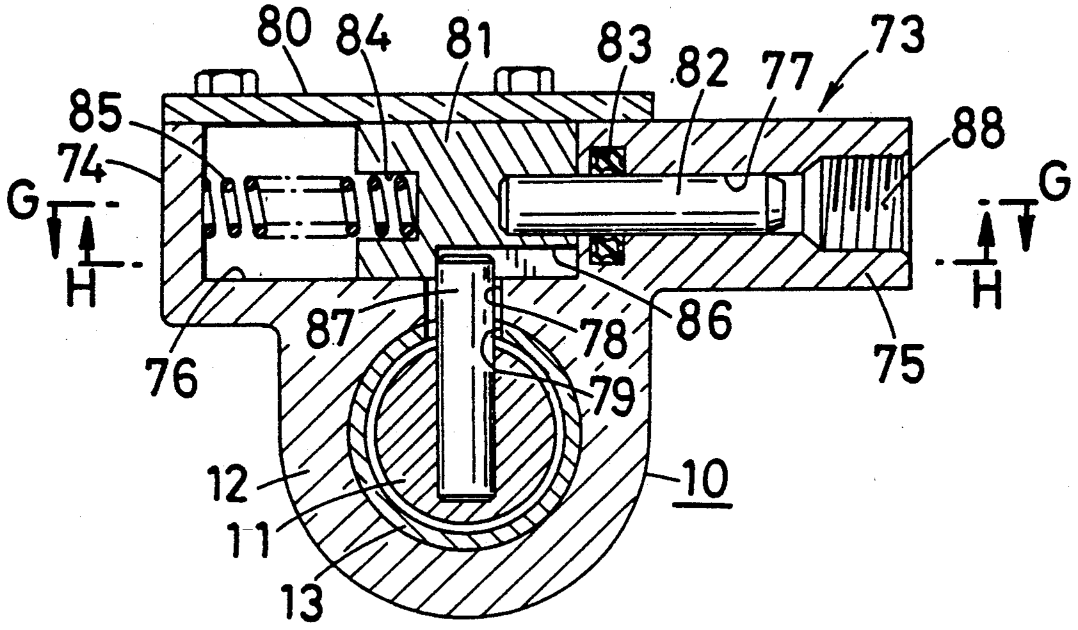
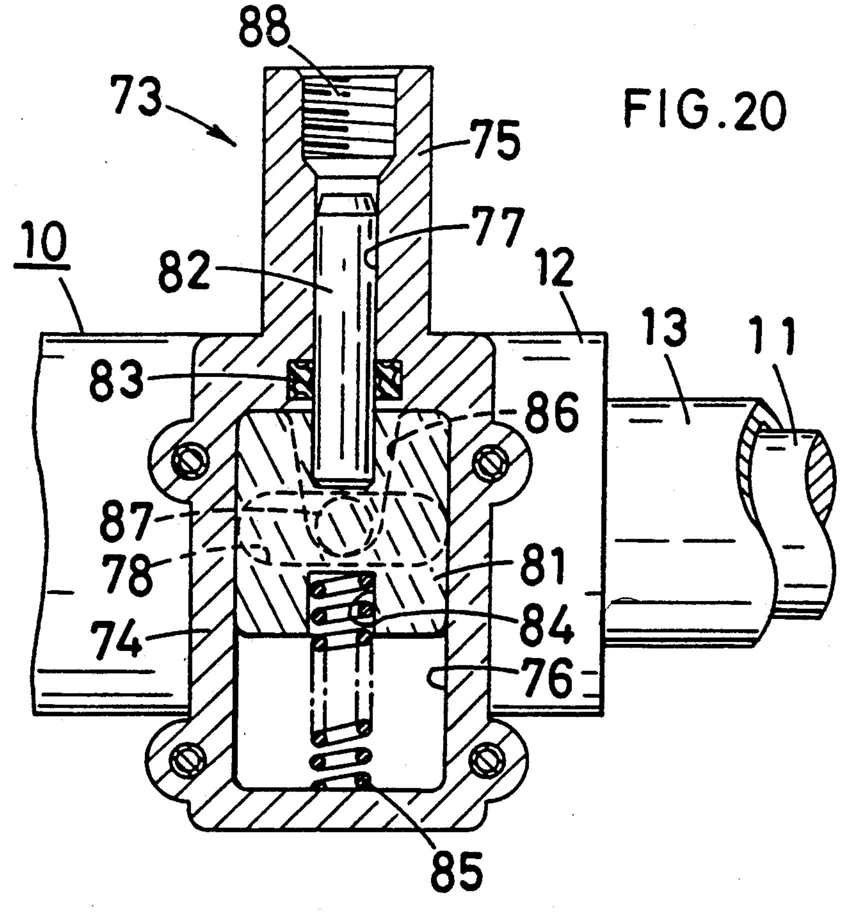
FIG.20

FOUR-WHEEL STEERING APPARATUS

BACKGROUND OF THE INVENTION

The present invention relates to a four-wheel steering apparatus for use in motor vehicles and the like.

Four-wheel steering apparatus for use in motor vehicles comprise a front-wheel steering device and a rear-wheel steering device. Rear-wheel steering devices are known which comprise a rear-wheel steering bar mechanically separated from the front-wheel steering device and movable by an electric motor in accordance with the speed of the vehicle and the steering amount of the front wheels for steering the rear wheels (see U.S. Pat. No. 4,669,744 and Unexamined Japanese Patent Publication HEI 1-136876).

With such rear-wheel steering devices, the relative steering direction of the rear wheels (the steering direction of the rear wheels relative to that of the front wheels) and the maximum permissible steering amount are controlled according to the speed of the vehicle.

FIG. 9 shows an example of relationship of the vehicle speed to the relative steering direction and steering amount (steering angle) of the rear wheels. In the drawing, the vehicle speed (km/h) is plotted as abscissa vs. the steering amount (deg.) as ordinate. Represented by the steering amount of 0 is the neutral state, by the positive steering amount a steering direction of the rear wheels which is the same as that of the front wheels, i.e., steering of the same phase, and by the negative steering amount a steering direction of the rear wheels which is reverse to that of the front wheels, i.e., steering of reverse phase. The solidline curve A represents maximum permissible steering amounts at varying vehicle speeds. When the vehicle speed is low in this case, reverse-phase steering is done, and the maximum permissible steering amount increases as the vehicle speed decreases. When the vehicle speed is high, same-phase steering is done, and the maximum permissible steering amount increases to a value and then decreases with increasing vehicle speed. Within the range of maximum permissible steering amounts at varying vehicle speeds, i.e., within the range surrounded by the curve A and the abscissa, the steering amount of the rear wheels is controlled in accordance with the steering amount of the front wheels. In either case of steering of reverse phase or same phase, the actual steering direction of the rear wheels changes with the steering direction of the front wheels. Accordingly, it follows that the curve A of FIG. 9 represents maximum permissible steering amounts of the rear wheels at varying vehicle speeds in either of right and left directions.

With the rear-wheel steering device described, the amount of movement of the rear-wheel steering bar is mechanically (structurally) limited, and the foregoing mode of control is effected within the mechanical limits. With reference to FIG. 9, the two dot-and-dash lines B and C parallel to the abscissa represent steering amounts when the rear-wheel steering bar is moved to the right and left mechanical limits. Naturally, these amounts are slightly greater than the greatest value of maximum permissible steering amounts of the curve A. Mechanically, the rear-wheel steering bar is movable by the mechanically limited maximum amount irrespective of the vehicle speed, so that the rear wheels can be steered between the line B and the line C.

In the case where the rear-wheel steering device operates normally in its entirety, the steering amount of the rear wheels will not exceed the range surrounded by the curve A and abscissa of FIG. 9. In the event of a runaway of the electric motor, however, the steering amount of the rear wheels is likely to greatly exceed the maximum permissible amount at a particular vehicle speed since mechanically the rear wheels can be steered between the two lines B and C, hence a great hazard especially during high-speed running.

The rear-wheel steering devices include those wherein the rear-wheel steering bar is movable hydraulically as by a hydraulic motor or cylinder as disclosed, for example, in Unexamined Japanese Patent Publication HEI 2-63974. The same problem as described above is encountered also with these devices.

SUMMARY OF THE INVENTION

The main object of the present invention is to provide a four-wheel steering apparatus which is operable with safety without the likelihood that the rear wheels will be steered much beyond the maximum permissible amount when the electric motor or the like operates out of control during high-speed running.

The present invention provides a four-wheel steering apparatus comprising a front wheel steering device having a front-wheel steering bar movable for steering front wheels, and a rear-wheel steering device having a rear-wheel steering bar mechanically separated from the front-wheel steering device and movable for steering rear wheels, the rear-wheel steering device having a rear-wheel steering bar drive assembly for moving the rear-wheel steering bar, and a rear-wheel steering control system for controlling the drive assembly in accordance with the steering amount of the front wheels to thereby control the amount of movement of the rear-wheel steering bar and control the steering amount of the rear wheels, the four-wheel steering apparatus being characterized in that the rear-wheel steering device comprises a maximum steering amount regulating assembly having a variably regulating member capable of mechanically restricting the maximum amount of movement of the rear-wheel steering bar and adjusting the maximum amount of movement, the apparatus further being characterized in that the maximum amount of movement of the rear-wheel steering bar to be mechanically restricted by the variably regulating member decreases as the vehicle speed increases.

The rear-wheel steering control system may be adapted to detect the vehicle speed and to control the maximum steering amount regulating assembly so that the maximum amount of movement of the rear-wheel steering bar to be mechanically restricted by the variably regulating member decreases as the vehicle speed increases.

The front-wheel steering device may comprise a hydraulic power steering mechanism for steering the front wheels by the rotation of a steering wheel and oil pressure in accordance with the rotational torque thereof, the power steering mechanism having a vehicle speed sensor pump for producing working oil pressure corresponding to variations in the vehicle speed, the maximum steering amount regulating assembly being connected to a hydraulic circuit of the vehicle speed sensor pump so that the maximum amount of movement of the rear-wheel steering bar to be mechanically restricted by the variably regulating member decreases as the working oil pressure of the sensor pump increases.

The invention further provides a four-wheel steering apparatus comprising a front wheel steering device having a front-wheel steering bar movable for steering front wheels, and a rear-wheel steering device having a rear-wheel steering bar mechanically separated from the front-wheel steering device and movable for steering rear wheels, the rear-wheel steering device having a rear-wheel steering bar drive assembly for moving the rear-wheel steering bar, and a rear-wheel steering control system for controlling the drive assembly in accordance with the steering amount of the front wheels to thereby control the amount of movement of the rear-wheel steering bar and control the steering amount of the rear wheels, the four-wheel steering apparatus being characterized in that the front-wheel steering device comprises a hydraulic power steering mechanism for steering the front wheels by the rotation of a steering wheel and oil pressure in accordance with the rotational torque thereof, the rear-wheel steering device comprising a maximum steering amount regulating assembly having a variably regulating member capable of mechanically restricting the maximum amount of movement of the rear-wheel steering bar and adjusting the maximum amount of movement, the maximum steering amount regulating assembly being connected to a hydraulic circuit of the power steering mechanism so that the maximum amount of movement of the rear-wheel steering bar to be mechanically restricted by the variably regulating member decreases as the front wheel steering oil pressure decreases.

With the four-wheel steering apparatus of the present invention, the maximum amount of movement of the rear-wheel steering bar to be mechanically restricted by the variably regulating member decreases during high-speed running to obviate the likelihood that the rear wheels will be steered by an amount in large excess of the maximum permissible amount when the electric motor or the like operates out of control.

BRIEF DESCRIPTION OF THE DRAWINGS

FIG. 12 is an enlarged view in section taken along the line I—I in FIG. 11;

FIG. 13 is a view in section taken along the line J—J in FIG. 12;

FIG. 19 is an enlarged view in section taken along the line F—F in FIG. 18;

FIG. 20 is a view in section taken along the line G—G in FIG. 19;

DESCRIPTION OF THE PREFERRED EMBODIMENTS

FIGS. 1 to 7 and 8(*a*) through 8(*c*) show a first embodiment.

Figure 1:
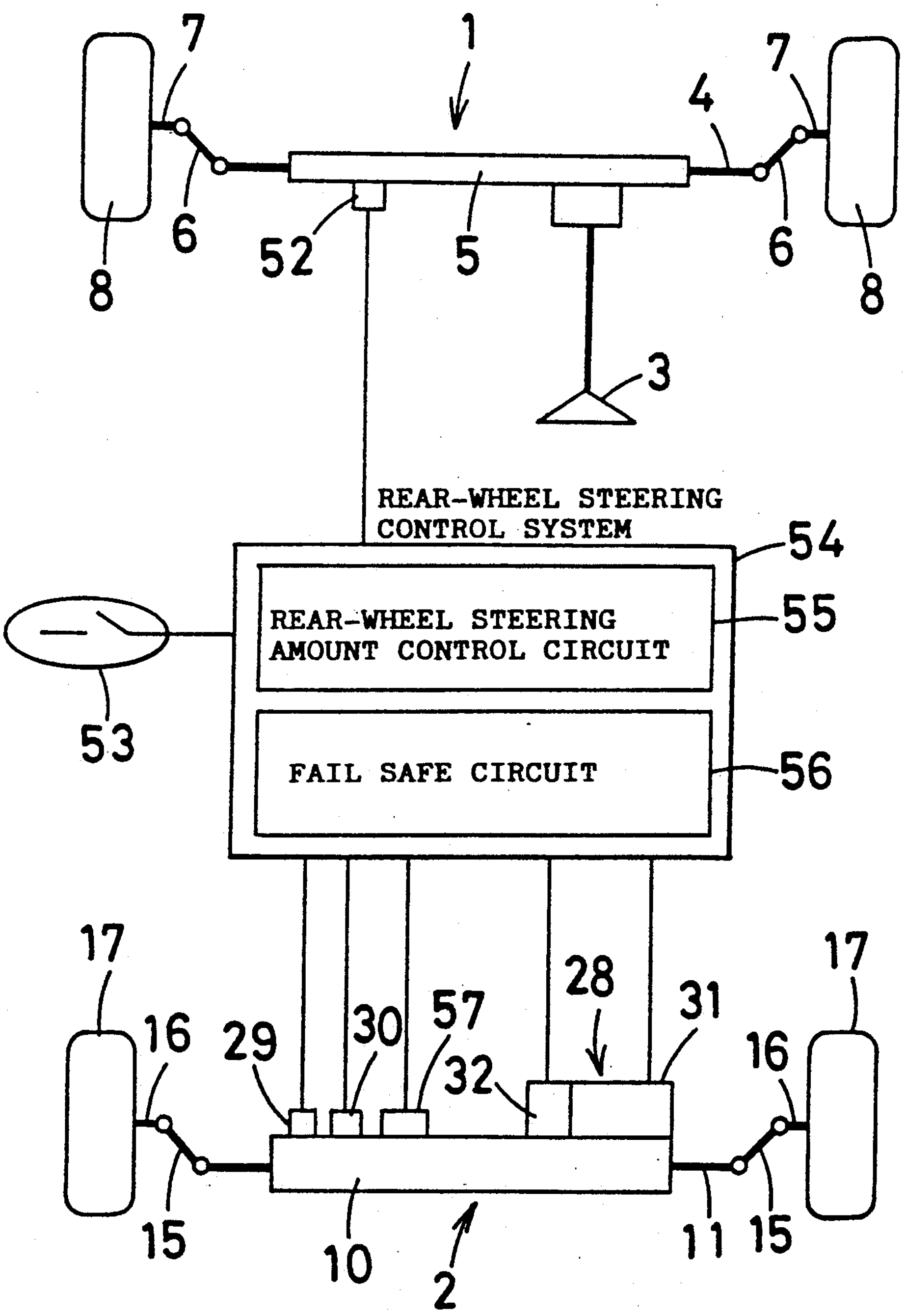
FIG. 1 is a diagram schematically showing the construction of a four-wheel steering apparatus for motor vehicles as a first embodiment of the invention.
Figure 2:
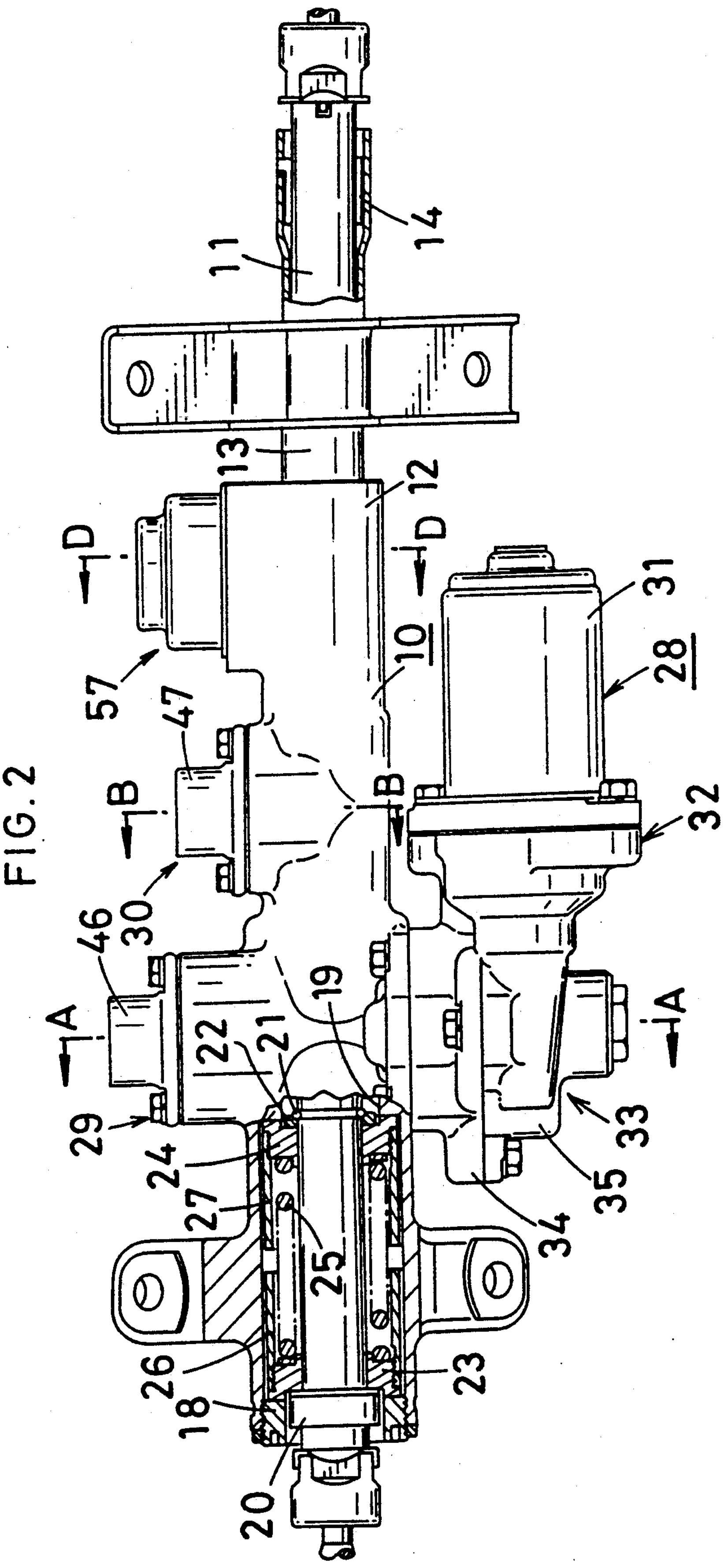
FIG. 2 is a plan view partly broken away and showing mechanical components of a rear-wheel steering device in FIG. 1.

FIG. 1 schematically shows the construction of a four-wheel steering apparatus comprising a front-wheel steering device 1 and a rear-wheel steering device 2 for use in motor vehicles. FIG. 2 shows mechanical components of the device 2.

The front-wheel steering device 1 is, for example, of the rack-pinion type already known wherein the rotation of a steering wheel 3 is transmitted to a front rack bar (front-wheel steering bar) 4 via an unillustrated pinion. The rack bar 4 extends laterally and is supported by a front housing 5 so as to be movable in the lateral direction (axial direction). The housing 5 is fixed to the body of a vehicle. The rack bar 4 is connected at each end thereof to a front wheel 8 by a tie rod 6 and a knuckle arm 7. The steering wheel 3, when rotated, moves the rack bar 4 rightward or leftward to steer the front wheels 8.

The rear-wheel steering device 2, like the front-wheel steering device 1, comprises a rear rack bar (rear-wheel steering bar) 11 supported by a rear housing 10. The housing 10 is in the form of a tube extending laterally and comprises a housing body 12 and a housing tube 13 fitted in the right end of the body. The rack bar 11 extends laterally as inserted through the housing 10 and is movable laterally as supported by known bush 14 and support yoke 58 (see FIG. 3) within the housing 10. The rack bar 11 is connected at each end thereof to a rear wheel 17 by a tie rod 15 and a knuckle arm 16. The rack bar 11, when moved rightward or leftward, steers the rear wheels 17.

The housing body 12 has an inward flange member 18 secured to the left end of its inner periphery and an inward flange 19 at a portion thereof rightwardly away from the member 18. An outward flange member 20 is secured to the outer periphery of the rack bar 11 at a portion thereof close to its left end and corresponding to the inward flange member 18 on the housing body 12. A retaining ring 21 is secured to an outer peripheral portion of the rack bar 11 corresponding to the inward flange 19 of the housing body 12. On the left side of the ring 21 immediately adjacent thereto, a stopper ring 22 is fitted around the rack bar 11. Between the inward flange member 18 and the inward flange 19 of the housing body 12, the rack bar 11 has laterally slidably fitted therearound a left slide ring 23 positioned on the right side of and immediately adjacent to the outward flange member 20 and a right slide ring 24 on the left side of and immediately adjacent to the stopper ring 22. A centering spring 25 in the form of a coiled compression spring is fitted around the rack bar 11 and positioned between the left and right slide rings 23, 24. A left regulating member 26 in the form of a hollow cylinder and extending rightward is fixedly provided around the left slide ring 23. A right regulating member 27 in the form of a hollow cylinder and extending leftward is fixedly provided around the right slide ring 24. While the rack bar 11 is not subjected to any lateral force, the centering spring 25 biases the left and right slide rings 23, 24 away from each other, pressing the left slide ring 23 into contact with the outward flange member 20 on the bar 11 and the right slide ring 24 with the stopper ring 22 on the bar 11. At this time, the stopper ring 22 is prevented from moving rightward by the retaining ring 21. Further at this time, the left slide ring 23 is in pressing contact with the inward flange member 18 of the housing body 12, and the right slide ring 24 with the inward flange 19 of the body 12, and the rack bar 11 is held in a neutral position.

While the rack bar 11 is in the neutral position, the right end of the left regulating member 26 and the left end of the right regulating 27 are laterally at a short distance from each other. When a rightward or leftward force greater than the force of the centering spring 25 acts on the rack bar 11, the rack bar 11 is movable rightward or leftward by an amount corresponding to the distance between the right and left regulating members 26, 27. When subjected to the leftward force, the rack bar 11 moves leftward with the outward flange member 20 brought out of contact with the left slide ring 23, whereupon the right slide ring 24 and the right regulating member 27 are also moved leftward by being pushed by the retaining ring 21 and the stopper ring 22. The rack bar 11 stops moving upon the left end of the right regulating member 27 coming into contact with the right end of the left regulating member 26 at rest. Conversely, when subjected to the rightward force, the rack bar 11 moves rightward with the stopper ring 22 brought out of contact with the right slide ring 24, whereupon the left slide ring 23 and the left regulating member 26 are also moved rightward by being pushed by the outward flange member 20. The rack bar 11 stops moving upon the right end of the left regulating member 20 striking against the left end of the right regulating member 27 at rest. Thus, mechanically, the rack bar 11 is movable rightward or leftward by an amount twice the distance between the right and left regulating members 26, 27 in the neutral state. This amount of movement will hereinafter be referred to as the "mechanically maximum amount of movement" of the rack bar 11, and the corresponding steering amount (steering angle) of the rear wheels 17 as the "mechanically maximum steering amount."

The housing body 12 is provided with a rack bar drive assembly (rear-wheel steering bar drive assembly) 28 for laterally moving the rack bar 11, a first steering amount detector 29 for detecting the steering amount of the rear wheels 17, and a second steering amount detector 30 for the same purpose.

The rack bar drive assembly 28 comprises an electric motor 31 serving as a drive source, clutch 32 and reduction gear 33. As shown in detail in FIG. 3, a first casing 34 is fixed to one face of the housing body 12, and a second casing 35 is fixed to one face of the first casing 34. A portion of the housing body 12, and the first and second casings 34, 35 form a gear compartment 36 inside thereof. The motor 31 is attached to another face of the second casing 35. Although not shown, the output shaft (motor shaft) of the motor 31 is connected to the input shaft of the clutch 32. Rotatably supported inside the gear compartment 36 are an intermediate gear shaft 37 and a pinion shaft 38 extending in parallel to each other and perpendicular to the rack bar 11. A worm 40 fixed to the output shaft 39 of the clutch 32 is in mesh with a worm wheel 41 fixed to the gear shaft 37. A small gear 42 fixed to the gear shaft 37 is in mesh with a large gear 43 fixed to the pinion shaft 38. A pinion 44 formed on the pinion shaft 38 is in mesh with a rack 45 formed on the rack bar 11. The rotation of the motor 31 is transmitted via the clutch 32 to the reduction gear 33, which in turn rotates the pinion 44 at a reduced speed to move the rack bar 11 rightward or leftward in meshing engagement with the pinion.

Figure 3:
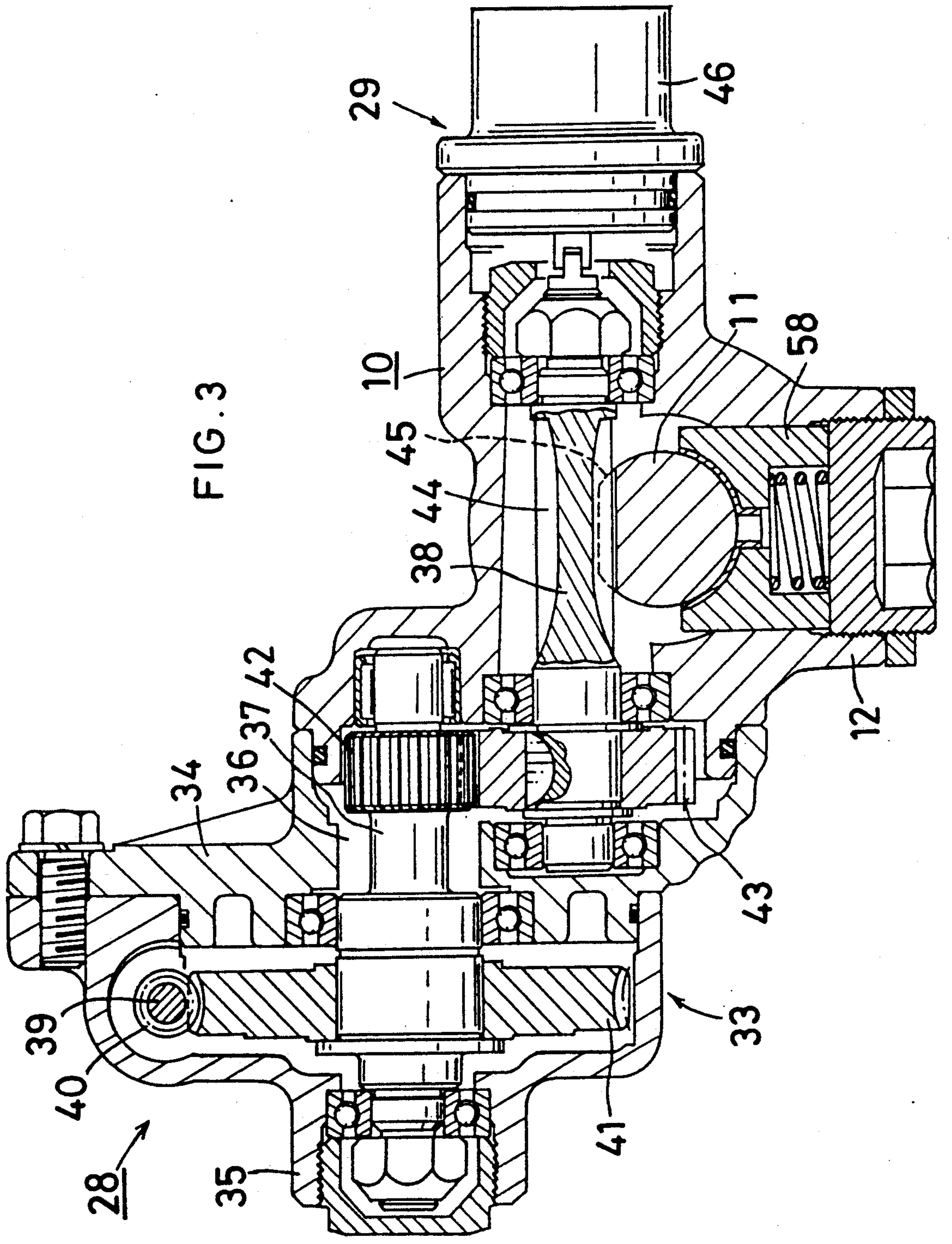
FIG. 3 is an enlarged view in section taken along the line A—A in FIG. 2.

As seen in detail in FIG. 3, the first steering amount detector 29 comprises a first rotation sensor 46, such as a potentiometer, attached to the housing body 12. The rotation sensor 46 is connected to one end of the pinion shaft 38 of reduction gear 33 of the rack bar drive assembly 28 for detecting the rotation of the pinion shaft 38 to thereby detect the steering amount of the rear wheels 17.

Figure 4:
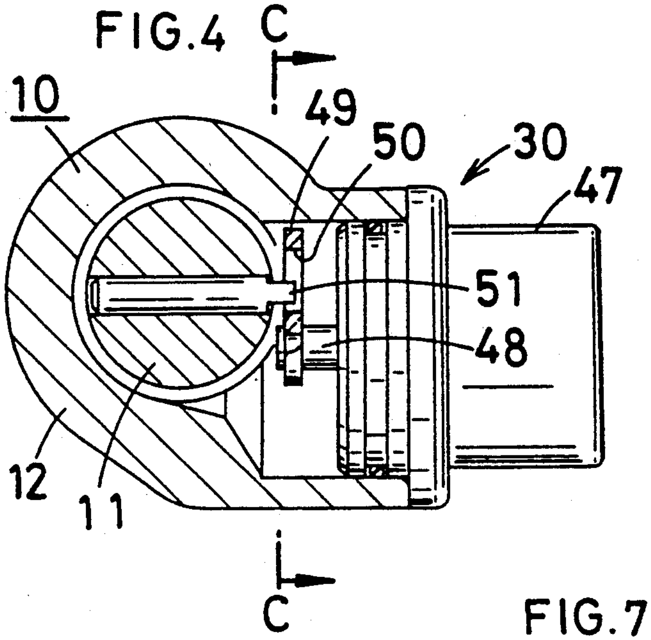
FIG. 4 is an enlarged view in section taken along the line B—B in FIG. 2.
Figure 5:
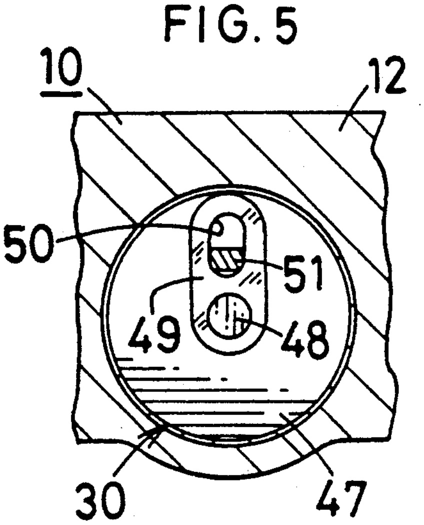
FIG. 5 is a view in section taken along the line C—C in FIG. 4.

The second steering amount detector 30 is shown in detail in FIGS. 4 and 5.

A second rotation sensor 47, such as a potentiometer, is attached to the housing body 12 and has an input shaft 48, to which one end of a lever 49 is fixed. The lever 49 is formed with a slot 50 extending lengthwise thereof. A pin 51 secured to the rack bar 11 has an outer end projecting from the outer periphery of the bar 11 and fitted in the slot 50 of the lever 49 so as to be movable longitudinally thereof. When the rack bar 11 moves laterally, the pin 51 also moves in the same direction while moving within the slot 50 longitudinally thereof to rotate the lever 49 rightward or leftward. The rotation sensor 47 detects the amount of rotation of the lever 49 to thereby detect the amount of movement of the rack bar 11, i.e., the steering amount of the rear wheels 17.

The front-wheel steering device 1 has a frontwheel steering amount detector 52 for detecting the steering amount of the front wheels 8 by suitable means.

The rear-wheel steering device 2 has a rear-wheel steering control system 54 for controlling the motor 31 and the clutch 32 of the rack bar drive assembly 28 in accordance with the outputs of a vehicle speed sensor 53, the front-wheel steering amount detector 52, and the first and second steering amount detectors 29, 30.

The control system 54 comprises a rear-wheel steering amount control circuit 55 and a fail safe circuit 56, which in turn comprise an electronic circuit or computer.

The steering amount control circuit 55 controls the amount of rotation of the motor 31 according to the vehicle speed and the steering amount of the front wheels 8 to thereby control the amount of movement of the rack bar 11, i.e., the steering amount of the rear wheels 17. More specifically, from the vehicle speed detected by the sensor 53 and based on the relationship shown in FIG. 9, the circuit 55 recognizes the steering direction and the maximum permissible steering amount of the rear wheels 17 at the vehicle speed to control the motor 31 within the range of the maximum amount according to the steering amount of the front wheels 8. At this time, the steering amount of the rear wheels 17 is detected by the first steering amount detector 29 and fed back to the control circuit 55. Further the fail safe circuit 56 always compares the output of the first steering amount detector 29 with the output of the second steering amount detector 30. If a difference greater than a predetermined value occurs therebetween, the circuit 56 interprets this as indicating a trouble developing in detecting the steering amount of the rear wheels 17, whereupon the circuit disengages the clutch 32 and deenergizes the motor 31 so as not to steer the rear wheels 17.

The rear-wheel steering device 2 has a maximum steering amount regulating assembly 57 for mechanically restricting the maximum amount of movement of the rack bar 11 within the range of the mechanically maximum amount of movement.

Figure 7:
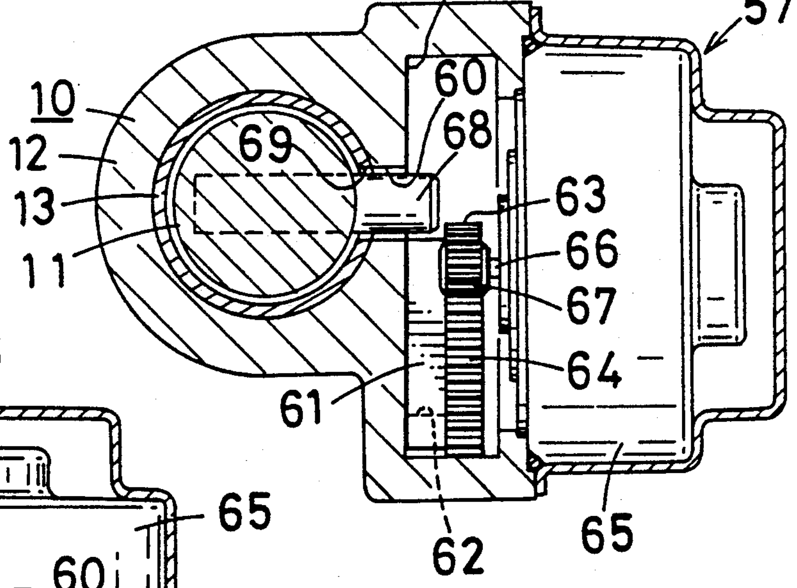
FIG. 7 is an enlarged view in section taken along the line D—D in FIG. 2.
Figure 6:
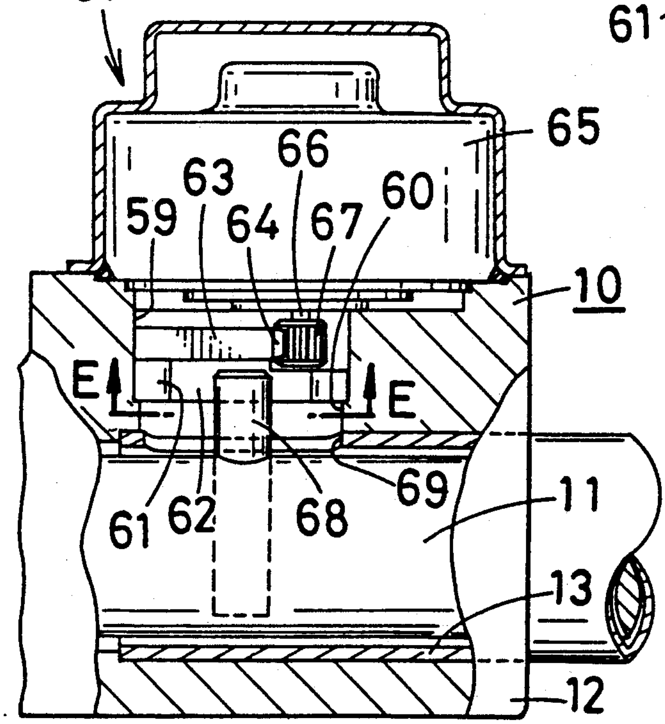
FIG. 6 is an enlarged plan view partly broken away and showing a maximum steering amount regulating assembly in FIG. 2.
Figure 8A:
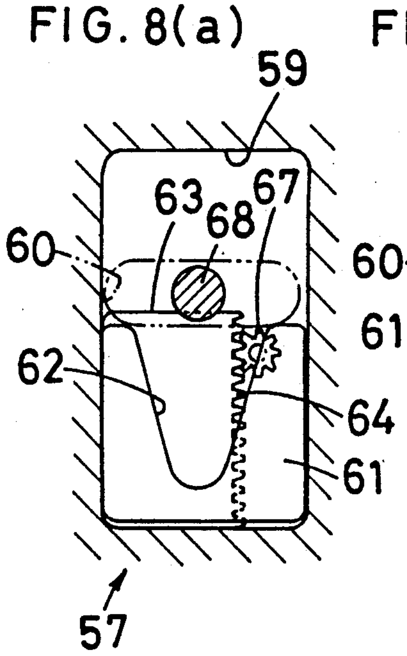
FIGS. 8(*a*) through 8(*c*) are views in section taken along the line E—E in FIG. 6.
Figure 8B:
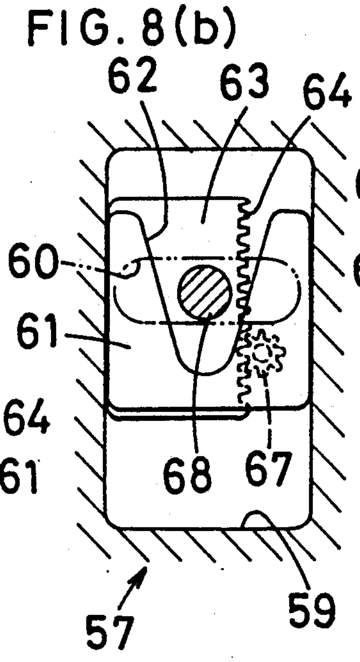
Figure 8C:
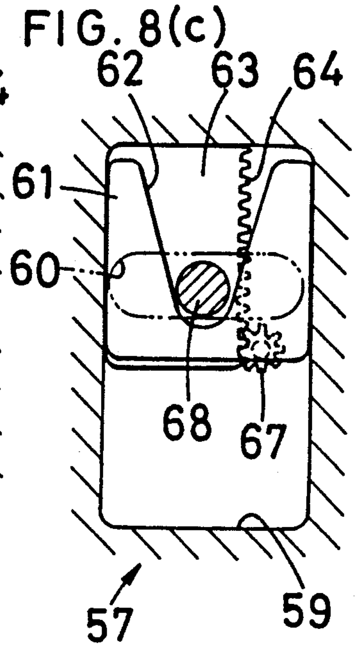

FIGS. 6, 7, and 8(*a*) through 8(*c*) show an example of construction of the maximum steering amount regulating assembly 57.

The wall of the housing body 12 is formed with a vertically elongated rectangular guide recessed portion 59. Laterally elongated slots 60 and 69 are formed respectively in the wall of the recessed portion 59 adjacent to the rack bar 11 and in the corresponding portion of the housing tube 13. A variably regulating member 61 in the form of a rectangular thick plate is vertically slidably fitted in the recessed portion 59. The regulating member 61 has a regulating groove 62 extending downward from its upper end, V-shaped and having a lateral width gradually decreasing downward. A rack plate 63 in the form of a rectangular thick plate is fixed as by unillustrated pins to the outer surface of the regulating member 61. The rack plate 63 has a smaller lateral width than the regulating member 61 and is formed with a rack 64 on the side face thereof recessed from the regulating member 61. The housing body 12 is externally provided with a step motor 65 opposed to the recessed portion 59 and having a motor shaft 66 extending into the recessed portion 59. A pinion 67 fixed to the shaft 66 is in mesh with the rack 64 of the rack plate 63. The rack plate 63 and the regulating member 61 are movable upward and downward within the recessed portion 59 by the rotation of the motor 65. The rack bar 11 has fixed thereto a pin 68 for regulating the amount of movement thereof. The pin 68 has one end projecting from the outer periphery of the rack bar 11, extending through the slots 69, 60 in the walls of the tube 13 and the housing body 12 into the recessed portion 59, and fittable in the groove 62 of the regulating member 61.

When the regulating member 61 is in a lowered limit position as seen in FIG. 8(*a*), the pin 68 is positioned above the regulating member 61, with the result that mechanically, the rack bar 11 is movable by the mechanically maximum amount without being restrained by the regulating member 61. When the regulating member 61 is in a raised limit position as shown in FIG. 8(*c*), the pin 68 is positioned as fitted in the bottom of the groove 62 of the regulating member 61. The groove width of this portion is only slightly larger than the diameter of the pin 68, so that the pin 68 is almost immovable laterally, rendering the rack bar 11 also almost immovable laterally. When the regulating member 61 is in a vertically intermediate position as shown in FIG. 8(*b*), the pin 68 is in an intermediate portion of the groove 62 of the regulating member 61, and the pin 68 and the rack bar 11 are laterally movable by an amount dependent on the groove width of this portion. Accordingly, the maximum amount of lateral movement of the rack bar 11 is mechanically restricted by controlling the vertical position of the regulating member 61.

Figure 9:
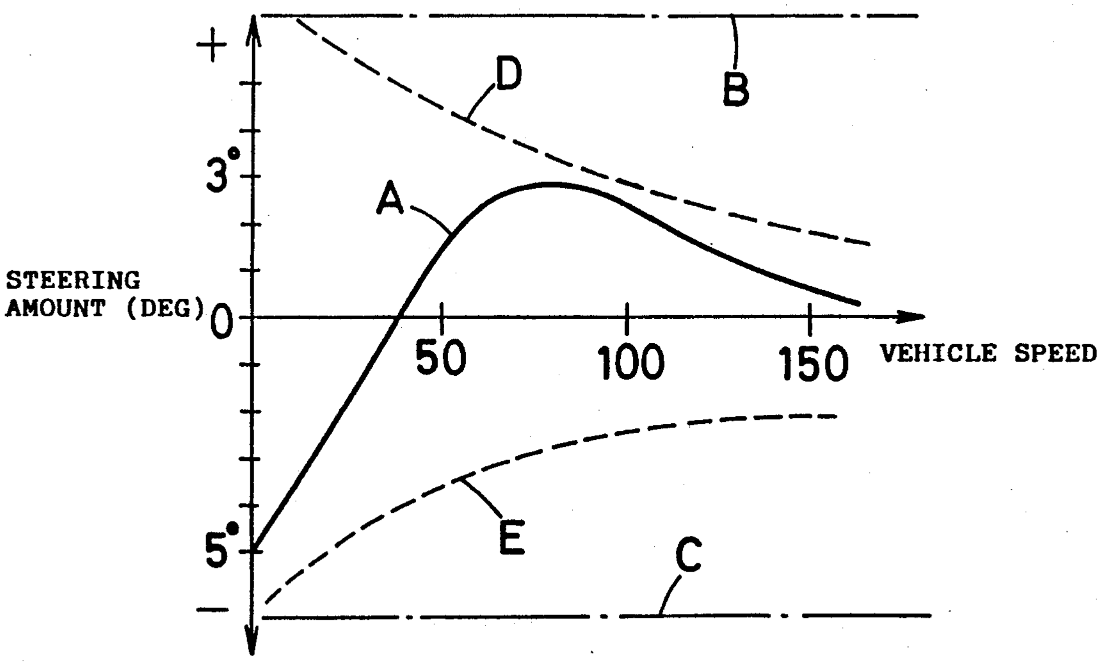
FIG. 9 is a graph showing the relationship between the vehicle speed and the relative steering amount of rear wheels.

The fail safe circuit 56 controls the step motor 65 so as to bring the regulating member 61 at a higher position as the vehicle speed increases, whereby the maximum amount of movement of the rack bar 11 is mechanically restricted so as to decrease as the vehicle speed increases as indicated in the broken curves D and E in FIG. 9. Consequently, even if the motor 31 of the rack bar drive assembly 28 operates out of control, the actual steering amount of the rear wheels 17 is restricted to a small value. The maximum amount of movement of the rack bar 11 is restricted to a small value especially during high-speed running. This assures high safety.

FIGS. 10 to 16 show a second embodiment.

Figure 10:
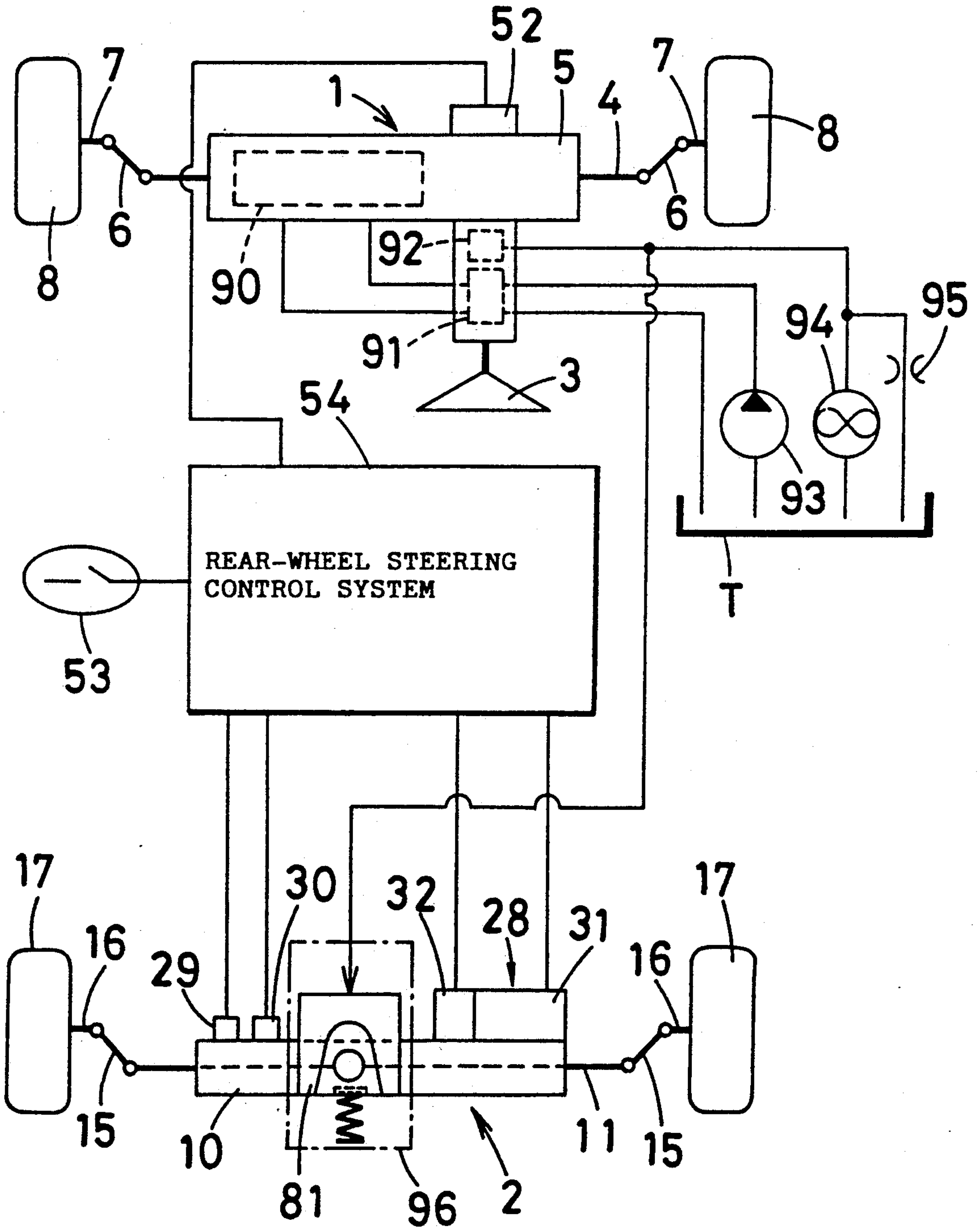
FIG. 10 is a diagram schematically showing the construction of a four-wheel steering apparatus for motor vehicles as a second embodiment of the invention.
Figure 11:
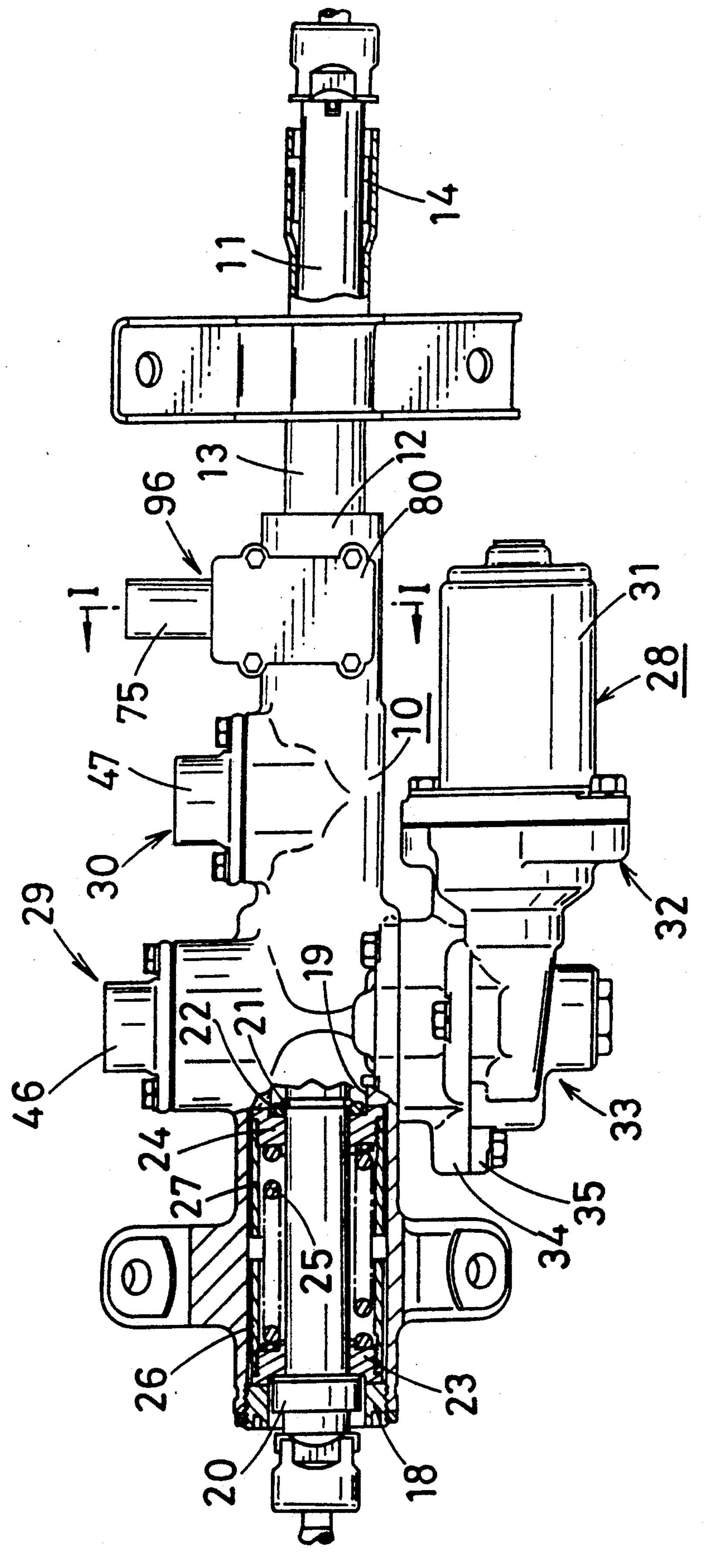
FIG. 11 is a plan view partly broken away and showing mechanical components of a rear-wheel steering device in FIG. 10.

FIG. 10 schematically shows the construction of a four-wheel steering apparatus for use in motor vehicles which is similar to the first embodiment. FIG. 11 shows mechanical components of the rear-wheel steering device 2 thereof. FIGS. 12 to 16 show components of the device in detail. Throughout FIGS. 1 to 16, like parts are designated by like reference numerals.

The front-wheel steering device 1 comprises a hydraulic power steering mechanism.

This mechanism is a known one as disclosed, for example, in Unexamined Japanese Patent Publication HEI 2-169371, and will be described below briefly although not shown in detail. The front housing 5 front rack bar 4 has at an intermediate portion thereof a piston slidable in contact with the inner peripheral surface of the cylinder portion 90. On the other hand, an input shaft connected to the steering wheel 3 is connected by a torsion bar to an output shaft connected to the pinion, and a hydraulic control valve 91 and a hydraulic reaction portion 92 are provided between these shafts. A hydraulic pump 93 connected to an oil tank T communicates with the two oil chambers of the cylinder portion 90 via the hydraulic control valve 91. The front wheels 8 are steered by the rotation of the steering wheel 3 and oil pressure in accordance with the rotational torque thereof. The hydraulic reaction portion 92 has connected thereto a vehicle speed sensor pump 94 in communication with the oil tank T via a fixed orifice 95. The vehicle speed sensor 94 is similar to the one disclosed, for example, in Examined Japanese Utility Model Publication SHO 60-38219 and produces working oil pressure corresponding to variations in the vehicle speed, such that the working oil pressure is great during high-speed running or is small during low-speed running. The vehicle speed sensor pump 94 controls the hydraulic reaction portion 92 so that the hydraulic pump 93 produces a great auxiliary steering force during low-speed running or a small auxiliary steering force during high-speed running.

The second embodiment includes a maximum steering amount regulating assembly 96 having the following construction (see FIGS. 12 to 16).

The upper wall of the housing body 12 is integrally formed with a rectangular parallelepipedal block 74 which is elongated longitudinally of the vehicle. A solid cylinder 75 extends forward from the front end of the block 74 integrally therewith. A guide recessed portion 76 in the form of a rectangular groove is formed in the upper side of the block 74. A cylinder bore 77 extends through the front portion of the block 74 and the cylinder 75 from the recessed portion 76 to the front end face of the cylinder 75. Laterally elongated slots 78 and 79 are formed respectively in the upper wall of the housing body 12 at the bottom of the recessed portion 76 and in the corresponding portion of the tube 13.

The upper opening of the recessed portion 76 is closed with a closure 80. A variably regulating member 81 in the form of a rectangular parallelepiped having a shorter length than the recessed portion 76 longitudinally of the vehicle is fitted in this portion 76 and is slidable forward and rearward. A plunger 82 projecting forward from the front end of the regulating member 81 is fixed thereto. The plunger 82 is intimately fitted in the cylinder bore 77 from behind and is slidable forward and rearward. A seal 83 is provided in the cylinder bore 77 for sealing off the clearance in the bore 77 around the plunger 82. A spring cavity 84 is formed in the rear end face of the regulating member 81. A coiled compression spring 85 for biasing the regulating member 81 forward is fitted in the cavity 84 in bearing contact with the rear wall of the recessed portion 76.

The regulating member 81 is formed in the bottom of its rear portion with a regulating groove 86 extending forward from the rear end of the member 81. When seen from below, the groove 86 is V-shaped and has a lateral width gradually decreasing forward. A pin 87 for regulating the amount of movement of the rack bar 11 is fixed to the bar 11 and projected upward from the top of the bar 11 into the recessed portion 76 through the slots 79, 78 of the tube 13 and the housing body 12, and is fittable in the groove 86 of the regulating member 81.

The cylinder bore 77 has a threaded tapered front end portion 88 for piping. This portion is held in communication with the hydraulic circuit of the vehicle speed sensor pump 94 of the front-wheel steering device 1 by a suitable pipe.

Figure 14:
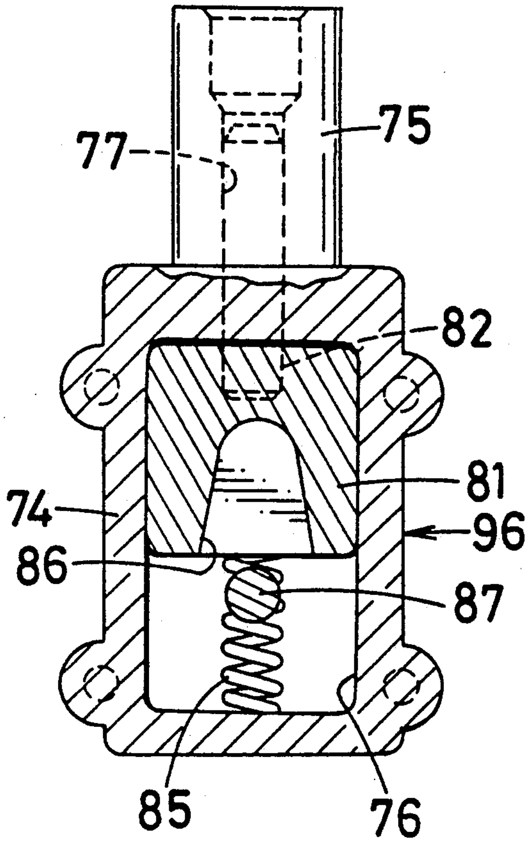
FIG. 14 is a view in section taken along the line K—K in FIG. 12.
Figure 15:
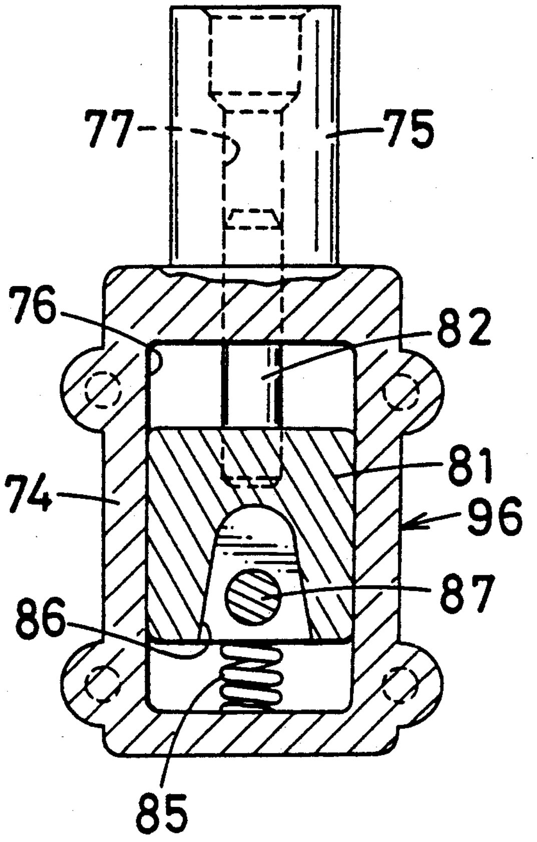
FIG. 15 is a view corresponding to FIG. 14 but showing a different state.
Figure 16:
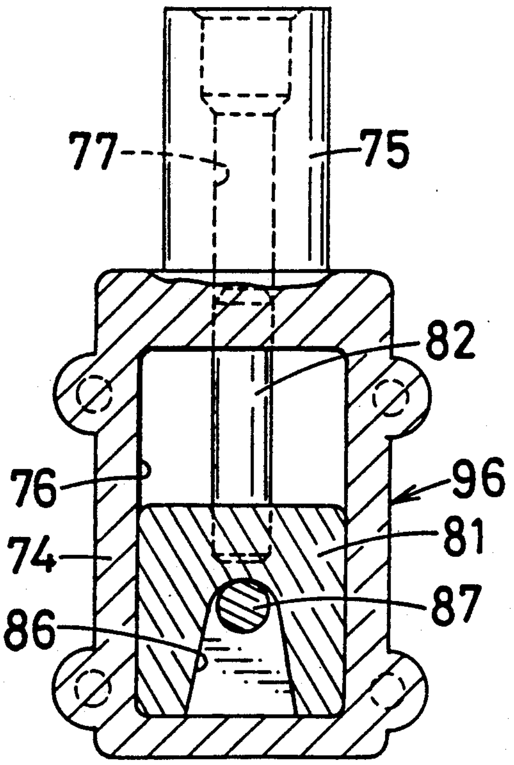
FIG. 16 is a view corresponding to FIGS. 14 and 15 but showing a different state.

When the oil pressure supplied to the cylinder bore 77 is small, the regulating member 81 is held by the spring 85 in an advanced limit position in contact with the front wall of the recessed portion 76, with the rear end of the member 81 positioned to the front of the pin 87 as seen in FIGS. 12 to 14. Accordingly, the pin 87 is positioned to the rear of the groove 86 of the regulating member 81 and is greatly movable laterally, consequently rendering the rack bar 11 also greatly movable laterally. When the oil pressure supplied to the cylinder bore 77 increases, the force pushing the plunger 82 rearward increases, moving the regulating member 81 rearward from its advanced limit position against the force of the spring 85 as shown in FIG. 15. This positions the pin 87 in the groove 86, rendering the pin 87 and the rack bar 11 laterally movable only by an amount dependent on the width of the groove portion where the pin is positioned. The amount of rearward movement of the regulating member 81 increases as the oil pressure increases in corresponding relation therewith. As the amount of rearward movement of the regulating member 81 increases, the width of the groove portion where the pin 87 is positioned decreases, also decreasing the maximum amount of lateral movement of the pin 87 and the rack bar 11. When the oil pressure supplied to the cylinder bore 77 further increases, moving the regulating member 81 to a retracted limit position in contact with the rear wall of the recessed portion 76 as seen in FIG. 16, the pin 87 fits in the front end of the groove 86. Since the groove width of this portion is larger than the diameter of the pin 87 only slightly, the pin 87 is almost immovable laterally, making the rack bar 11 also almost immovable laterally.

While the vehicle is at a stop or while it is running at a low speed, the working oil pressure of the vehicle speed sensor pump 94 is small, and the oil pressure supplied to the regulating assembly 96 is also small. Consequently, the regulating member 81 advances, increasing the maximum amount of movement of the rear rack bar 11 to be mechanically restricted by the groove 86 and therefore permitting the rear wheels 17 to be steered through a large angle.

An increase in the vehicle speed increases the working oil pressure of the sensor pump 94 and also increases the oil pressure to be supplied to the regulating assembly 96. As the vehicle speed increases, accordingly, the regulating member 81 moves rearward to decrease the maximum amount of movement of the rear rack bar 11 to be mechanically restricted by the groove 86. As a result, even if the motor 31 runs away or operates out of control, there is no likelihood that the rear wheels 17 will be steered by an amount greatly in excess of the maximum permissible steering amount.

FIGS. 17 to 22 show a third embodiment.

Figure 17:
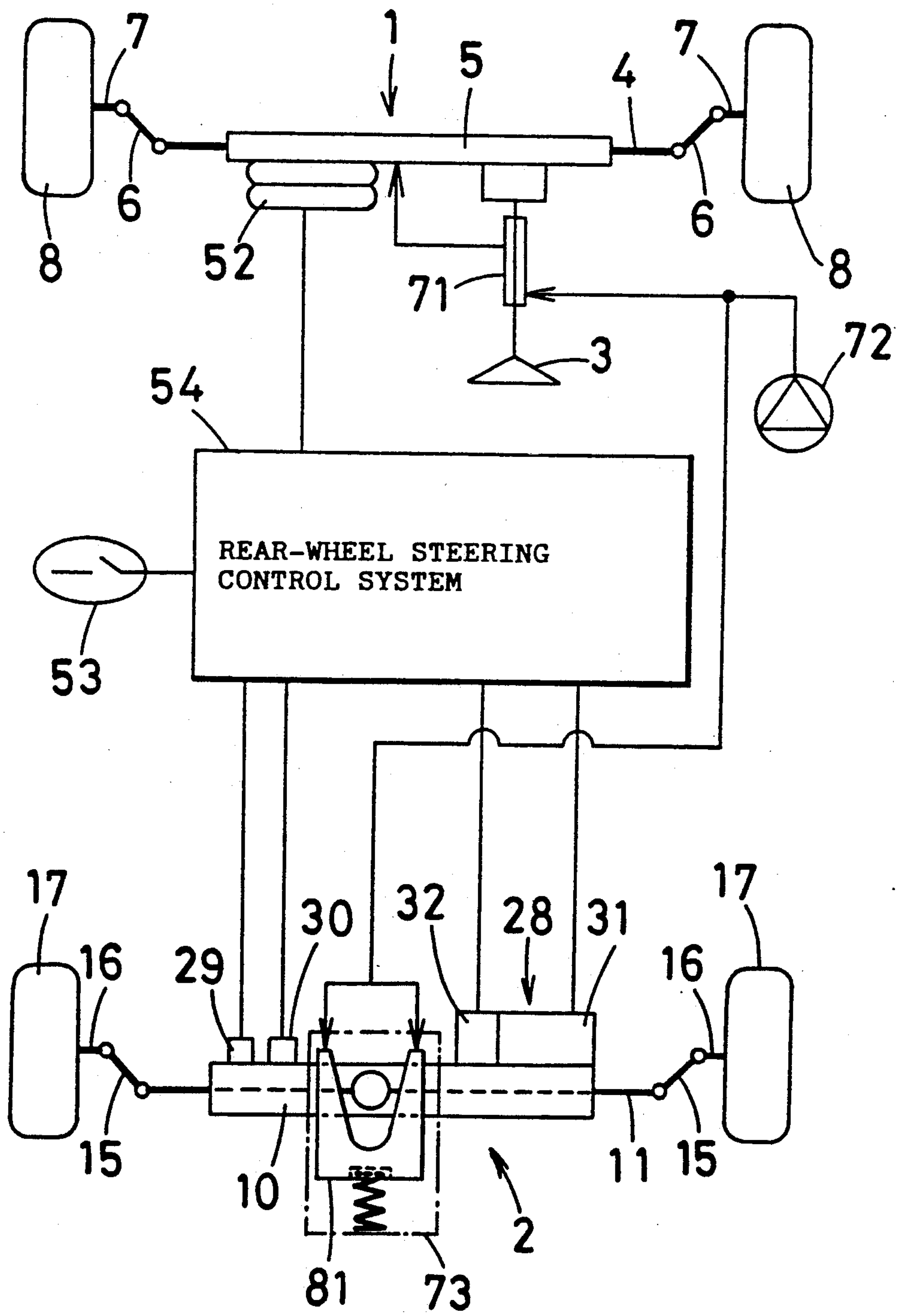
FIG. 17 is a diagram schematically showing the construction of a four-wheel steering apparatus for motor vehicles as a third embodiment of the invention.
Figure 18:
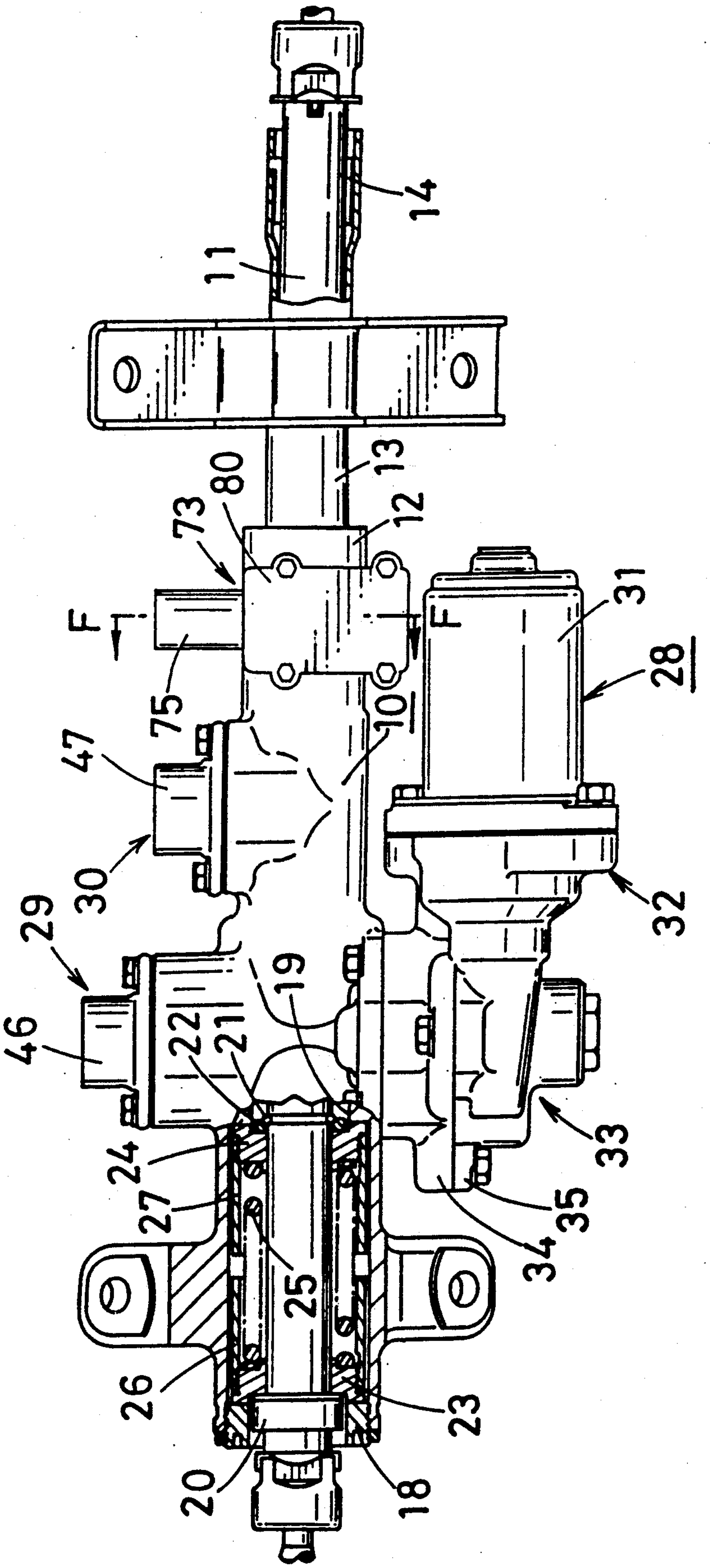
FIG. 18 is a plan view partly broken away and showing mechanical components of a rear-wheel steering device in FIG. 17.

FIG. 17 schematically shows the construction of another four-wheel steering apparatus for use in motor vehicles which is similar to the first embodiment. FIG. 18 shows mechanical components of the rear-wheel steering device 2. FIGS. 19 to 22 show components of the device in greater detail. Throughout the drawings showing these embodiments, like parts are designated by like reference numerals.

The front-wheel steering device 1 has a hydraulic power steering mechanism.

This mechanism, which is of the known type, has, for example, the following construction although not shown in detail. The front housing 5 is locally formed with a hydraulic cylinder integral therewith, and the front rack bar 4 is provided at an intermediate portion thereof with a piston slidable in contact with the inner peripheral surface of the cylinder. On the other hand, an input shaft connected to the steering wheel 3 and an output shaft connected to the pinion are interconnected by a torsion bar. A hydraulic control valve 71 is provided between these shafts. A hydraulic pump 72 communicates with the two oil chambers of the cylinder via the hydraulic control valve 71. The front wheels 8 are steered by the rotation of the steering wheel 3 and oil pressure in accordance with the rotational torque thereof.

The third embodiment includes a maximum steering amount regulating assembly 73 having the following construction (see FIGS. 19 to 22). Since this assembly 73 is similar to the maximum steering amount regulating assembly 96 of the second embodiment, like parts are designed by like reference numerals throughout the drawings showing these embodiments, and the different feature only will be described.

The regulating member 81 is formed in the bottom side of its front portion with a regulating groove 86 extending from the front end of the member 81 rearward. When seen from below, this groove 96 is V-shaped and has a lateral width gradually decreasing toward the rear.

The threaded tapered front end portion 88 of the cylinder bore 77 is held in communication by a suitable pipe with a suitable portion, where the steering oil pressure of the front wheels acts, of the hydraulic circuit of the power steering mechanism of the frontwheel steering device 1, e.g., with the discharge side of the hydraulic pump 72.

Figure 21:
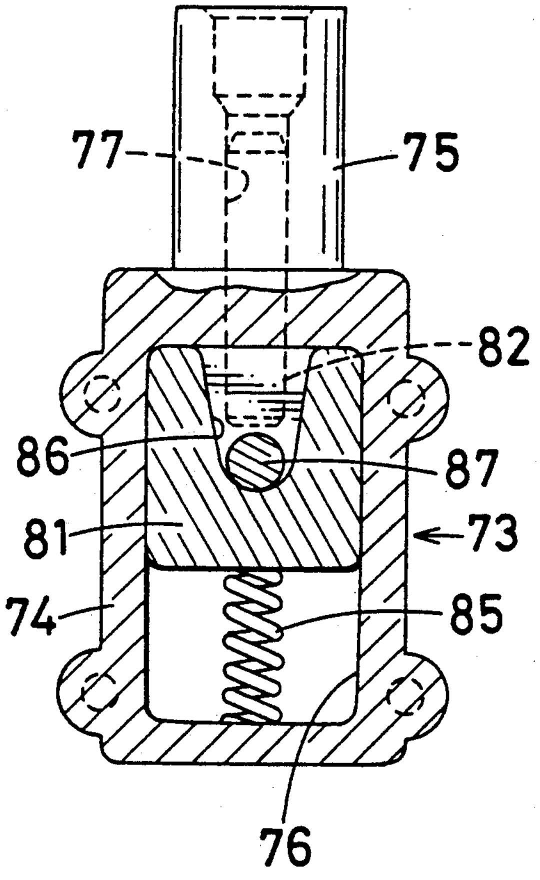
FIG. 21 is a view in section taken along the line H—H in FIG. 19.
Figure 22:
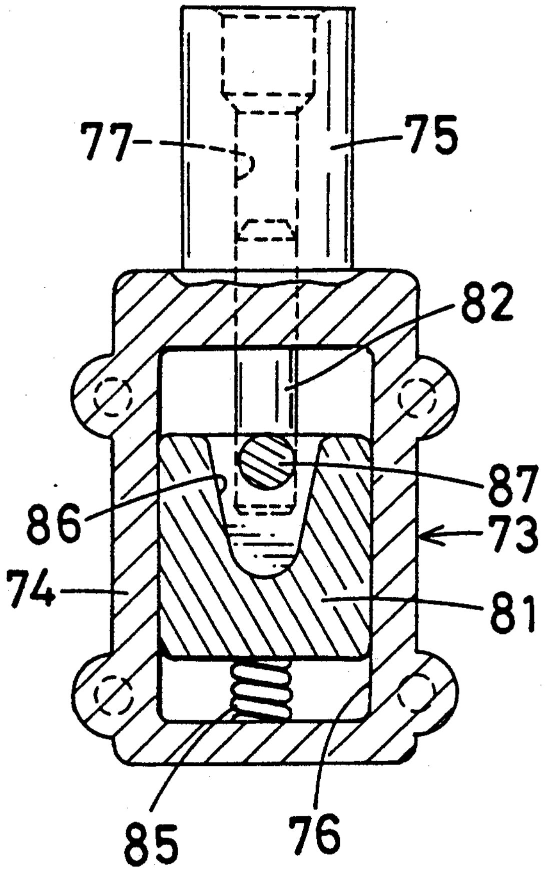
FIG. 22 is a view corresponding to FIG. 21 but showing a different state.

When the oil pressure supplied to the cylinder bore 77 is small, the regulating member 81 is held by the spring 85 in an advanced limit position in contact with the front wall of the recessed portion 76 as seen in FIGS. 19 to 21, with the pin 87 fitting in the rear end of the groove 87. Since the groove width of this portion is larger than the diameter of the pin 87 only slightly, the pin 87 is almost immovable laterally, rendering the rack bar 11 also almost immovable laterally. When the oil pressure supplied to the cylinder bore 77 increases, the force pushing the plunger 82 rearward increases, moving the regulating member 81 from the advanced limit position rearward against the force of the spring 86 as shown in FIG. 22. This brings the pin 87 to an intermediate portion of the groove 86, making the pin 87 and the rack bar 11 laterally movable by an amount dependent on the groove width of this portion. The amount of rearward movement of the regulating member 81 increases as the oil pressure increases in corresponding relation with the pressure. As the amount of rearward movement of the regulating member 81 increases, the groove width of the portion where the pin 87 is positioned increases to increase the maximum amount of lateral movement of the pin 87 and the rack bar 11.

While the steering wheel 3 is not manipulated, the front wheel steering oil pressure of the power steering mechanism of the front-wheel steering device 1 is very small, and the oil pressure to be supplied to the regulating assembly 73 is also very small. As a result, the regulating member 81 is located in its advanced limit position or in the vicinity thereof, and the maximum amount of movement of the rear rack bar 11 to be mechanically restricted by the groove 86 is very small. Accordingly, even if the motor 31 runs away, there is little or no likelihood that the rear wheels 17 will be steered.

When the steering wheel 3 is manipulated while the vehicle is at a stop or while it is running at a low speed, the oil pressure for steering the front wheels 8 is great, and the oil pressure supplied to the regulating assembly 73 is also great. Consequently, the regulating member 81 moves rearward, increasing the maximum amount of movement of the rear rack bar 11 to be mechanically restricted by the groove 86 and therefore making it possible to steer the rear wheels 17 greatly.

At an increased vehicle speed, the front wheel steering oil pressure when the steering wheel 3 is manipulated is smaller, and the oil pressure to be supplied to the regulating assembly 73 is also smaller. As the vehicle speed increases, therefore, the regulating member 81 moves forward to decrease the maximum amount of movement of the rear rack bar 11 to be mechanically restricted by the groove 86. Accordingly, even if the motor 31 operates out of control, it is unlikely that the rear wheels 17 will be steered by an amount greatly in excess of the maximum permissible steering amount.

What is claimed is:

1. A four-wheel steering apparatus for a vehicle having a rotatable steering wheel, front wheels, and rear wheels, the steering wheel when rotated having a rotational torque, said apparatus comprising:

(a) a front-wheel steering device comprising a hydraulic power steering mechanism for steering the front wheels in response to rotation of the steering wheel and oil pressure in proportion to the rotational torque of the steering wheel, said power steering mechanism including a movable front-wheel steering bar and a vehicle speed sensor pump for producing a working oil pressure corresponding to variations in and in proportion to the vehicle speed, said vehicle speed sensor pump including a hydraulic circuit; and (b) a rear-wheel steering device including:

(i) a rear-wheel steering bar mechanically separated from said front-wheel steering device and movable for steering the rear wheels;

(ii) a rear-wheel steering bar drive assembly for moving said rear-wheel steering bar;

(iii) a maximum steering amount regulating assembly having a variably regulating member for mechanically restricting the maximum amount of movement of said rear-wheel steering bar and for adjusting the maximum amount of movement of said rear-wheel steering bar to decrease as the vehicle speed increases, said maximum steering amount regulating assembly being connected to said hydraulic circuit of said vehicle speed sensor pump to decrease the maximum amount of movement of said rear-wheel steering bar which is mechanically restricted by said variably regulating member as the working oil pressure of said sensor pump increases; and (iv) a rear-wheel steering control system for controlling said rear-wheel steering bar drive assembly in accordance with the steering amount of the front wheels to thereby control the amount of movement of said rear-wheel steering bar and control the steering amount of the rear wheels.

2. A four-wheel steering apparatus for a vehicle having a rotatable steering wheel, front wheels, and rear wheels, the steering wheel when rotated having a rotational torque, said apparatus comprising:

(a) a front-wheel steering device including a hydraulic power steering mechanism for steering the front wheels in response to the rotation of the steering wheel and oil pressure in proportion to the rotational torque of the steering wheel, said power steering mechanism including a hydraulic circuit and a movable front-wheel steering bar; and (b) a rear-wheel steering device including:

(i) a rear-wheel steering ar mechanically separated from said front-wheel steering device and movable for steering the rear wheels;

(ii) a rear-wheel steering bar drive assembly for moving said rear-wheel steering bar;

(iii) a maximum steering amount regulating assembly having a variably regulating member for mechanically restricting the maximum amount of movement of said rear-wheel steering bar to decrease as the vehicle speed increases and for adjusting the maximum amount of movement of said rearwheel steering bar, said maximum steering amount regulating assembly being connected to said hydraulic circuit of said power steering mechanism to decrease the maximum amount of movement of said rear-wheel steering bar which is mechanically restricted by said variably regulating member in response to a decrease in the front wheel steering oil pressure; and (iv) a rear-wheel steering control system for controlling said rear-wheel steering bar drive assembly in accordance with the steering amount of the front wheels to thereby control the amount of movement of said rear-wheel steering bar and control the steering amount of the rear wheels.

3. The four-wheel steering apparatus of claim 2, wherein said rear-wheel steering bar drive assembly comprises an electric motor.

4. A four-wheel steering apparatus for a vehicle having a rotatable steering wheel, front wheels, and rear wheels, the steering wheel when rotated having a rotational torque, said apparatus comprising:

(a) a front-wheel steering device having a front-wheel steering bar movable for steering the front wheels;

(b) a rear-wheel steering device including:

(i) a rear-wheel steering bar mechanically separated from said front-wheel steering device and movable for steering the rear wheels;

(ii) a rear-wheel steering bar drive assembly for moving said rear-wheel steering bar;

(iii) a maximum steering amount regulating assembly comprising a variably regulating member for mechanically restricting the maximum amount of movement of said rear-wheel steering bar to decrease as the vehicle speed increases and for adjusting the maximum amount of movement of said rear-wheel steering bar, said variably regulating member having a groove perpendicular to said rear-wheel steering bar and an amount-of-movement regulating member fitted in said groove, said groove extending in one direction with its width gradually decreasing, and said variably regulating member being fixed to said rear-wheel steering bar, wherein movement of said variably regulating member in a direction perpendicular to said rear-wheel steering bar changes the position of said amount-of-movement regulating member in said groove to decrease the maximum amount of movement of said rear-wheel steering bar to be mechanically restricted by said variably regulating member, as the vehicle speed increases; and (iv) a rear-wheel steering control system for controlling the rear-wheel steering bar drive assembly in accordance with the steering amount of the front wheels to thereby control the amount of movement of the rear-wheel steering bar and control the steering amount of the rear wheels.

5. The four-wheel steering apparatus of claim 4, wherein said rear-wheel steering control system detects a vehicle speed; and wherein said four-wheel steering apparatus further comprises means for controlling said maximum steering amount regulating assembly to decrease the maximum amount of movement of said rear-wheel steering bar to be mechanically restricted by said variably regulating member, as the vehicle speed increases.

6. The four-wheel steering apparatus of claim 4, wherein said front-wheel steering device includes a hydraulic power steering mechanism for steering the front wheels in response to the rotation of the steering wheel and oil pressure in proportion to the rotational torque of the steering wheel; and wherein said hydraulic power steering mechanism includes a vehicle speed sensor pump for producing a working oil pressure corresponding to variations in and in proportion to the vehicle speed, said vehicle speed sensor pump including an oil pressure circuit connected to said maximum steering amount regulating assembly to decrease the maximum amount of movement of the rear-wheel steering bar which is mechanically restricted by said variably regulating member as the working oil pressure of said vehicle speed sensor pump increases.

7. A four-wheel steering apparatus for a vehicle having a rotatable steering wheel, front wheels, and rear wheels, the steering wheel when rotated having a rotational torque, said apparatus comprising:

(a) a front-wheel steering device comprising a hydraulic power steering mechanism for steering the front wheels in response to the rotation of the steering wheel and oil pressure in proportion to the rotational torque of the steering wheel, said power steering mechanism including a movable front-wheel steering bar and a hydraulic circuit; and (b) a rear-wheel steering device including:

(i) a rear-wheel steering bar mechanically separated from said front-wheel steering device and movable for steering the rear wheels;

(ii) a rear-wheel steering bar drive assembly for moving said rear-wheel steering bar; and (iii) a maximum steering amount regulating assembly comprising a variably regulating member for mechanically restricting the maximum amount of movement of said rear-wheel steering bar and for adjusting the maximum amount of movement of said rear-wheel steering bar, said variably regulating member having a groove perpendicular to said rear-wheel steering bar and an amount-of-movement regulating member fitted in said groove, said groove extending in one direction with its width gradually decreasing, and said regulating member being fixed to said rear-wheel steering bar, said maximum steering amount regulating assembly being connected to said oil pressure circuit of said hydraulic power steering mechanism, whereby movement of said variably regulating member in a direction perpendicular to said rear-wheel steering bar changes the position of said amount-of-movement regulating member in said groove to decrease the maximum amount of movement of said rear-wheel steering bar to be mechanically restricted by said variably regulating member, as the front-wheel steering oil pressure decreases; and (c) a rear-wheel steering control system for controlling said rear-wheel steering bar drive assembly in accordance with the steering amount of the front wheels to thereby control the amount of movement of said rear-wheel steering bar and control the steering amount of the rear wheels.

* * * * *